(12) United States Patent
Ludtke et al.

(10) Patent No.: US 6,279,059 B1
(45) Date of Patent: Aug. 21, 2001

(54) DOCKING STATION

(75) Inventors: Harold Aaron Ludtke, San Jose; Eric D. Edwards, San Francisco, both of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/258,810

(22) Filed: Feb. 26, 1999

(51) Int. Cl.[7] .............................. G06F 13/14; G06F 13/20
(52) U.S. Cl. ........................ 710/62; 710/15; 710/64; 713/200; 713/201; 709/229
(58) Field of Search ..................... 73/200, 201; 709/229; 710/1, 15, 62, 64

(56) References Cited

U.S. PATENT DOCUMENTS

| | | | |
|---|---|---|---|
| 5,139,261 | * 8/1992 | Openiano | 273/148 B |
| 5,456,332 | * 10/1995 | Borenstein | 180/167 |
| 5,609,525 | * 3/1997 | Ohno et al. | 463/43 |
| 5,878,211 | * 3/1999 | Delagrange et al. | 395/186 |
| 5,936,240 | * 8/1999 | Dudar et al. | 250/253 |
| 6,027,257 | * 2/2000 | Richards et al. | 396/428 |
| 6,042,382 | * 3/2000 | Halfhill | 434/59 |
| 6,064,421 | * 5/2000 | Pohl | 348/14 |

* cited by examiner

Primary Examiner—Thomas Lee
Assistant Examiner—Rehama Perveen
(74) Attorney, Agent, or Firm—Finnegan, Henderson, Farabow, Garrett & Dunner, L.L.P.

(57) ABSTRACT

A docking station includes a platform, a motion control mechanism, a power source, a mount, a signal interface, and a platform signal routing system. The power source powers the motion control mechanism to move the platform. The mount allows attaching a peripheral device to the platform. The signal interface interfaces the platform with a network. The platform signal routing system routes signals from the signal interface to the motion control mechanism.

41 Claims, 10 Drawing Sheets

Y-axis translational motion

Z-axis translational motion

X-axis translational motion

DOCKING STATION

TECHNICAL FIELD

The present invention relates generally to remote control operations. More particularly, the present invention relates to the placement and remote control of sensors and other devices.

BACKGROUND ART

Industrial automation frequently requires the placement of sensors or other devices in locations difficult to access for installation, operation, repair, or removal. For example, a surveillance system may include multiple cameras in inconspicuous locations. Desirable attributes of such placements could include, among others: simplicity; low cost; ease of installation, operation, repair, and removal; flexibility in the initial selection of the sensors or other devices; flexibility to subsequently change the sensors or other devices; maximizing the range of motion of the sensors or other devices; establishing and maximizing control over the motion of the sensors or other devices; and maximizing the rate of information transfer to and from the sensors or other devices.

It has been proposed that docking stations could provide some combination of these desirable attributes. However, some of these attributes, such as simplicity and low cost, conflict with others, such as flexibility and maximizing the range of motion. As a result of these conflicts, design optimization significantly complicates the development of such docking stations. Moreover, communicating with and controlling the operation of such sensors and other devices often proves difficult.

Thus, there exists a need in the art to provide docking stations that overcome the disadvantages of prior art placement and remote control of sensors and other devices and to improve communications with and control of such sensors and other devices.

DISCLOSURE OF THE INVENTION

Accordingly, the present invention is directed to a docking station that substantially obviates one or more of the problems due to limitations and disadvantages of the related art.

To achieve these and other advantages and in accordance with the purpose of the invention, as embodied and broadly described, the invention includes a platform, a motion control mechanism, a power source, a mount, a signal interface, and a platform signal routing system. The motion control mechanism is operably coupled to the platform. The power source is operably coupled to the motion control mechanism. The mount allows attachment of a peripheral device to the platform. The signal interface interfaces the platform with a network. The platform signal routing system routes signals from the signal interface to the motion control mechanism.

In one embodiment of this invention, the signal interface is a high-speed serial interface and the platform signal routing system is a high-speed platform signal routing system.

In another embodiment of this invention, the signal interface is an IEEE 1394 protocol signal interface and the platform signal routing system is an IEEE 1394 protocol platform signal routing system.

In a further aspect, the invention includes a platform, a motion control mechanism, a power source, a mount, first and second signal interfaces, and a platform signal routing system. The motion control mechanism is operably coupled to the platform. The power source is operably coupled to the motion control mechanism. The mount allows attachment of a peripheral device to the platform. The first signal interface interfaces the platform with a network. The second signal interface interfaces the platform with the peripheral device. The platform signal routing system routes signals from the first signal interface to the motion control mechanism and from the second signal interface to the first signal interface.

In one embodiment of this further aspect of the invention, the first and second signal interfaces are high-speed serial interfaces and the platform signal routing system is a high-speed platform signal routing system.

In another embodiment of this further aspect of this invention, the first and second signal interfaces are IEEE 1394 protocol signal interfaces and the platform signal routing system is an IEEE 1394 protocol platform signal routing system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention. In the drawings.

BEST MODE FOR CARRYING OUT THE INVENTION

Figure 1:
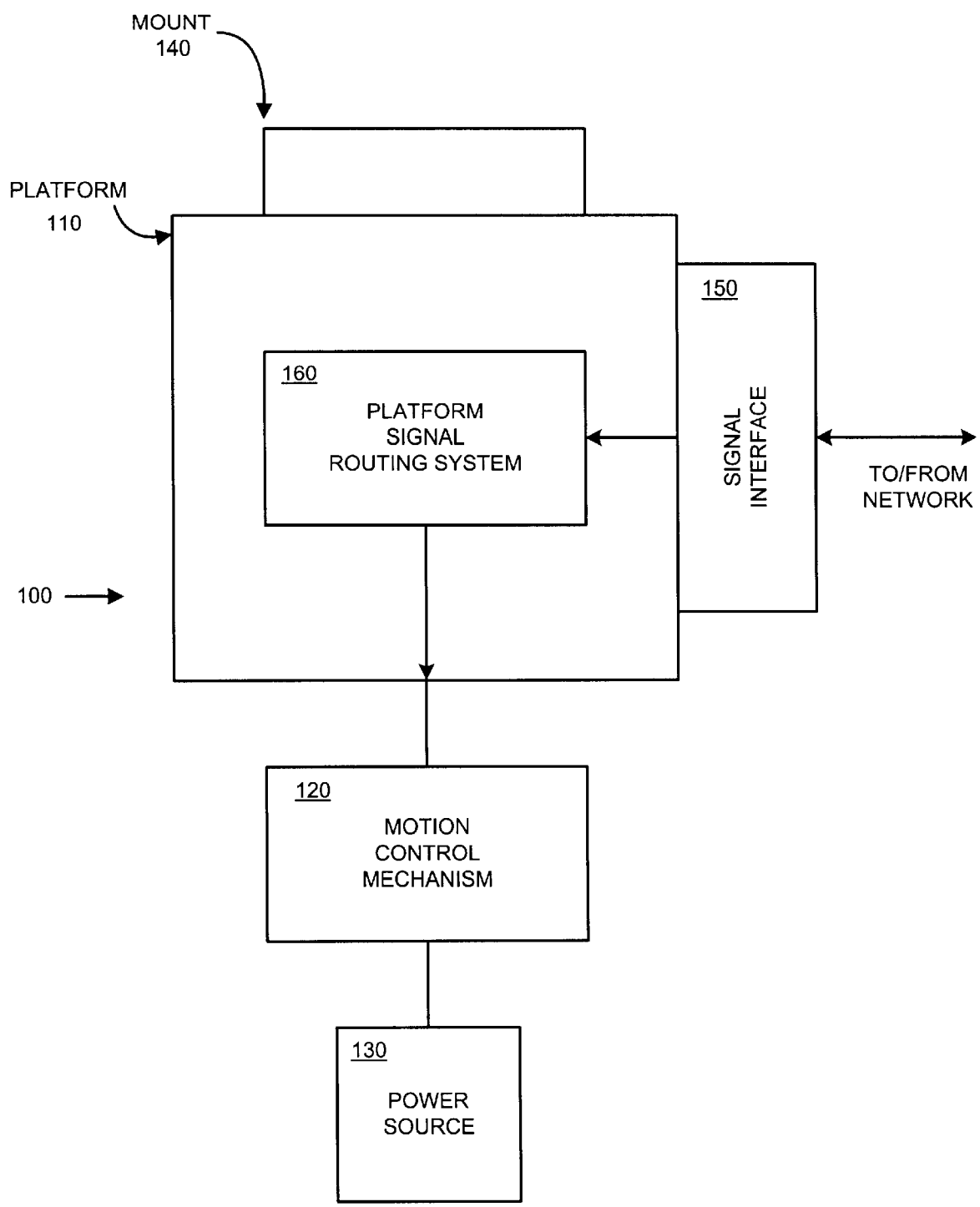
FIG. 1 is a block diagram of a docking station with motion control and signal interface, in accordance with one embodiment of the present invention.
Figure 3:
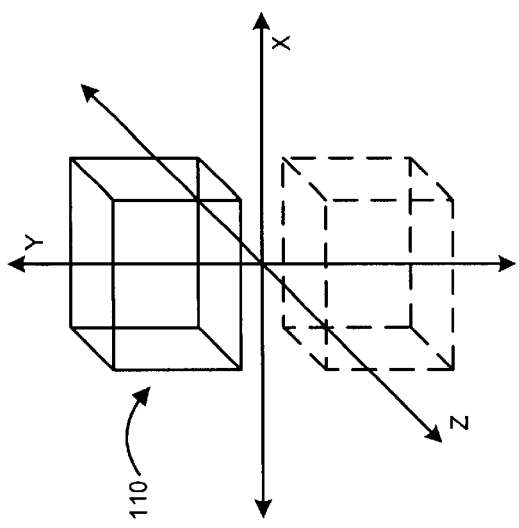
FIG. 3 is a perspective view illustrating Y-axis translational motion.
Figure 4:
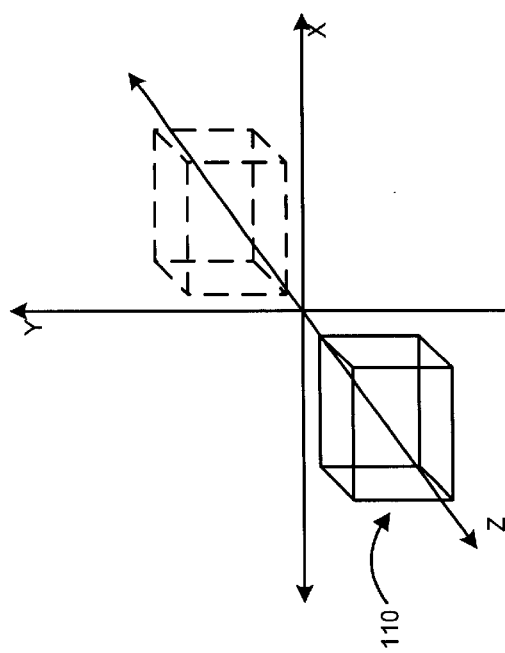
FIG. 4 is a perspective view illustrating Z-axis translational motion.
Figure 2:
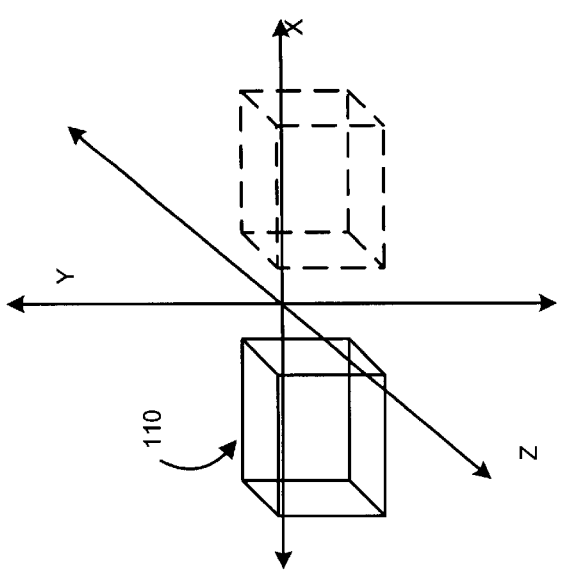
FIG. 2 is a perspective view illustrating X-axis translational motion.
Figure 6:
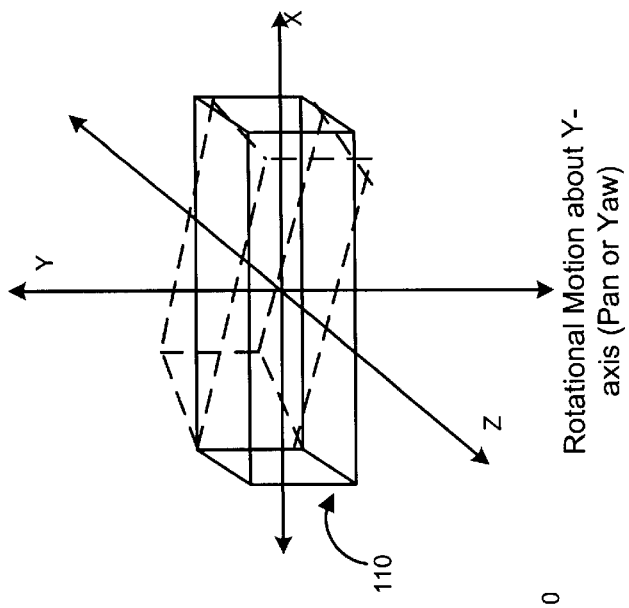
FIG. 6 is a perspective view illustrating rotational motion about the Y-axis (known as pan or yaw)
Figure 7:
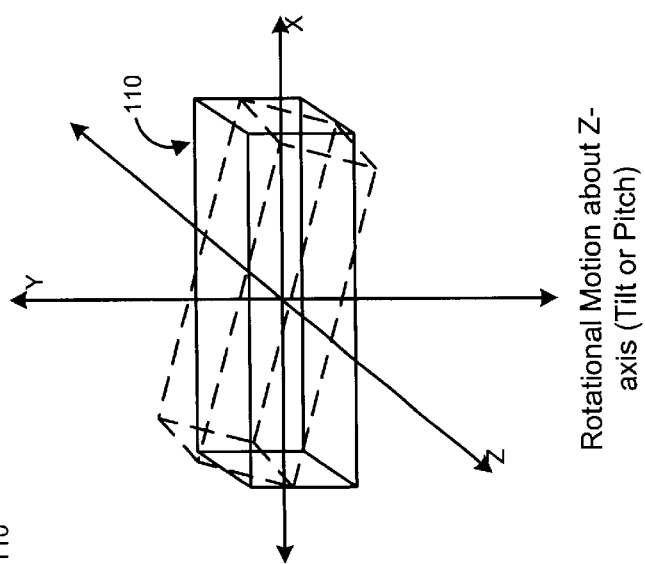
FIG. 7 is a perspective view illustrating rotational motion about the Z-axis (known as tilt or pitch)
Figure 5:
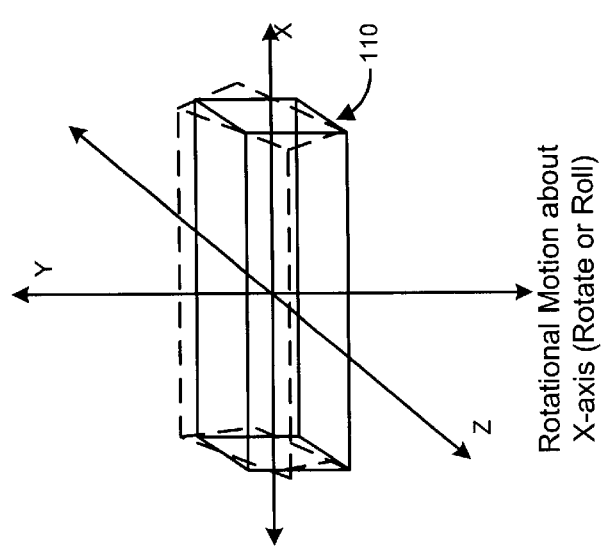
FIG. 5 is a perspective view illustrating rotational motion about the X-axis (known as rotate or roll)

Reference will now be made in detail to the present preferred embodiments of the invention, examples of which are illustrated in the accompanying drawings. Wherever possible, the same reference characters will be used throughout the drawings to refer to like or similar parts.

FIG. 1 is a block diagram of a docking station 100, in accordance with an embodiment of the present invention. Docking station 100 comprises platform 110, motion control mechanism 120, power source 130, mount 140, signal interface 150, and platform signal routing system 160. Motion control mechanism 120 is operably coupled to platform 110. Power source 130 is operably coupled to motion control mechanism 120. Mount 140, signal interface 150, and platform signal routing system 160 are located in or on platform 110.

Platform 110 may include any physical structure suitable for the present invention. Such physical structures are well known in the art. Platform 110 may exhibit up to six-degree freedom of motion, including: (1) X-axis translation, (2) Y-axis translation, (3) Z-axis translation, (4) rotation about the X-axis, (5) rotation about the Y-axis, and (6) rotation about the Z-axis, as shown in FIGS. 2–7.

Motion control mechanism 120 may be any motion control mechanism or combination of such mechanisms suitable to move the platform in the required translational and/or rotational degrees of freedom of motion. Motion control mechanism 120 may include an unlimited range of rotational motion in any combination of roll, pitch, and/or yaw. Such motion control mechanisms may include tracks, bearings, gimbals, or other structural elements. Such motion control mechanisms are well known in the art.

Power source 130 is preferably an electrical power source suitable to power the motion control mechanism, however, any suitable power source can be used, including, for example, a hydraulic or pneumatic power source. Such power sources are well known in the art.

Mount 140 may be any mount suitable for attaching a peripheral device to the platform. Such peripheral devices may include, for example, digital video cameras, digital still cameras, and ultrasonic or infrared detectors. Mount 140 may be custom designed for a specific peripheral device, such as a "snap lock" connection, or may be more generic.

Signal interface 150 must be suitable for interfacing platform 110 to a network. In particular, signal interface 150 may be a high-speed serial interface. For example, in applications where speed is critical, such as transmitting and editing video signals, the signal interface may comprise an IEEE 1394 protocol interface or derivative. As is known, some implementations of the IEEE 1394 protocol include power conductors. In other applications, where cost is of greater importance, the signal interface may comprise a Universal Serial Bus (USB) or equivalent. Signal interface 150 may be configured as a wired or wireless connection.

Platform signal routing system 160 must be suitable for routing signals from signal interface 150 to motion control mechanism 120. In particular, platform signal routing system 160 should be capable of routing high-speed signals to motion control mechanism 120 when signal interface 150 is a high-speed serial interface.

Figure 8:
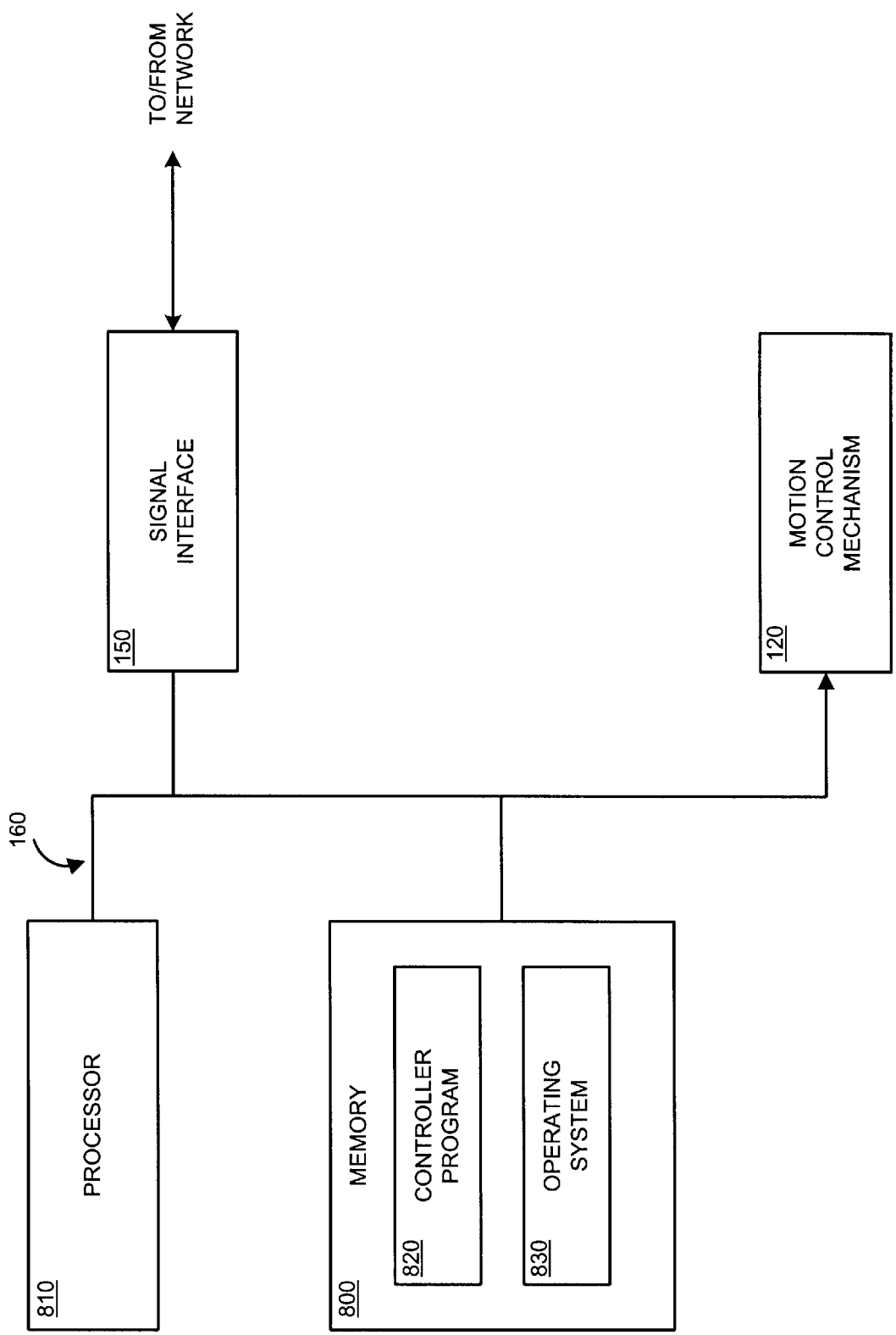
FIG. 8 is a block diagram of a platform signal routing system for a docking station with motion control and signal interface, in accordance with one embodiment of the present invention.

FIG. 8 is a block diagram of platform signal routing system 160, in accordance with an embodiment of the present invention. Platform signal routing system 160 electrically connects and routes signals between motion control mechanism 120, signal interface 150, memory 800, and processor 810.

Memory 800 preferably comprises controller program 820 and operating system 830, each of which includes instructions in the form of software or firmware executed by processor 810.

Figure 9:
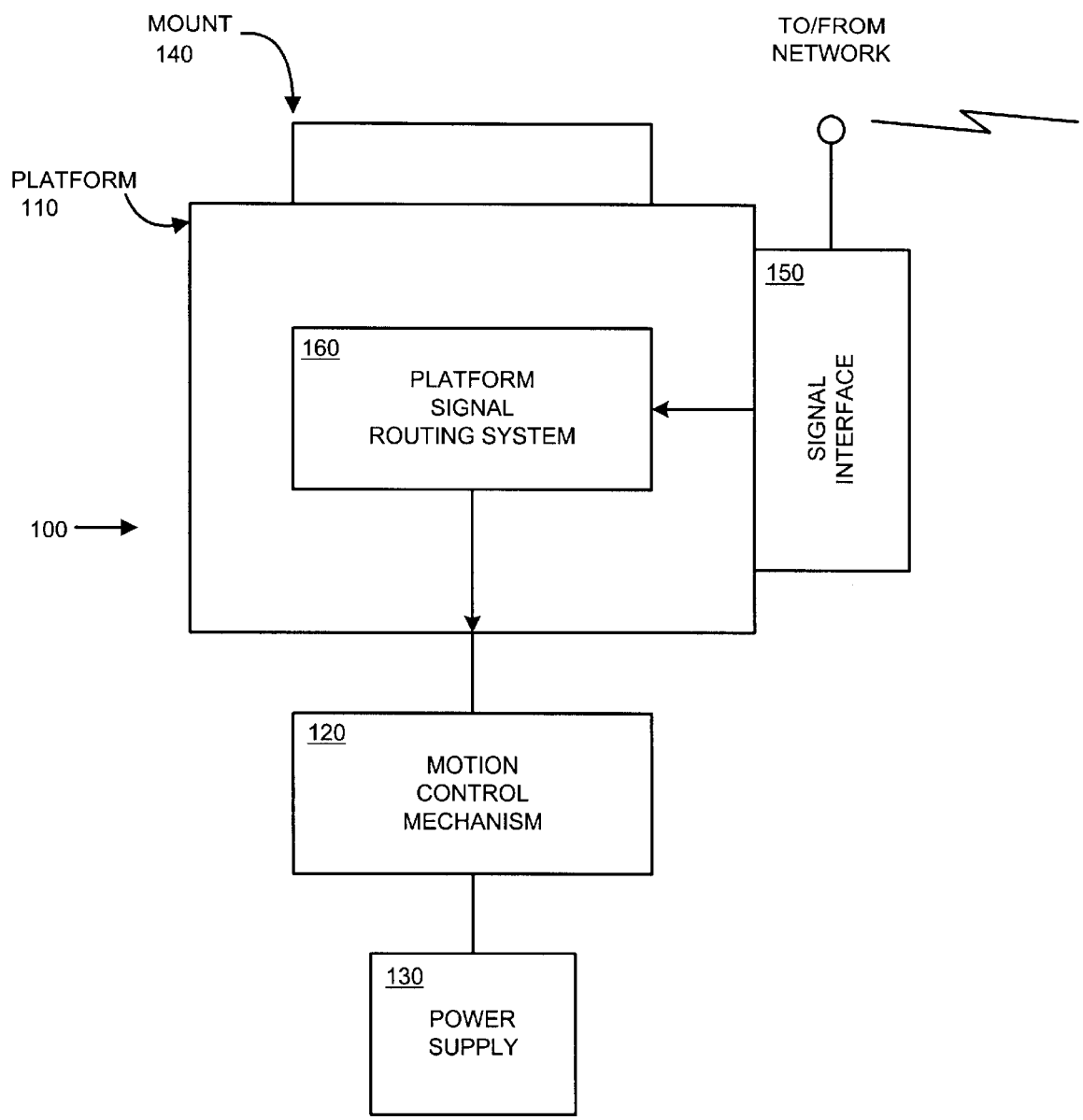
FIG. 9 is a block diagram of a docking station with motion control and wireless signal interface, in accordance with another embodiment of the present invention.

FIG. 9 is a block diagram of docking station 100, where signal interface 150 is configured as a wireless connection.

Figure 10:
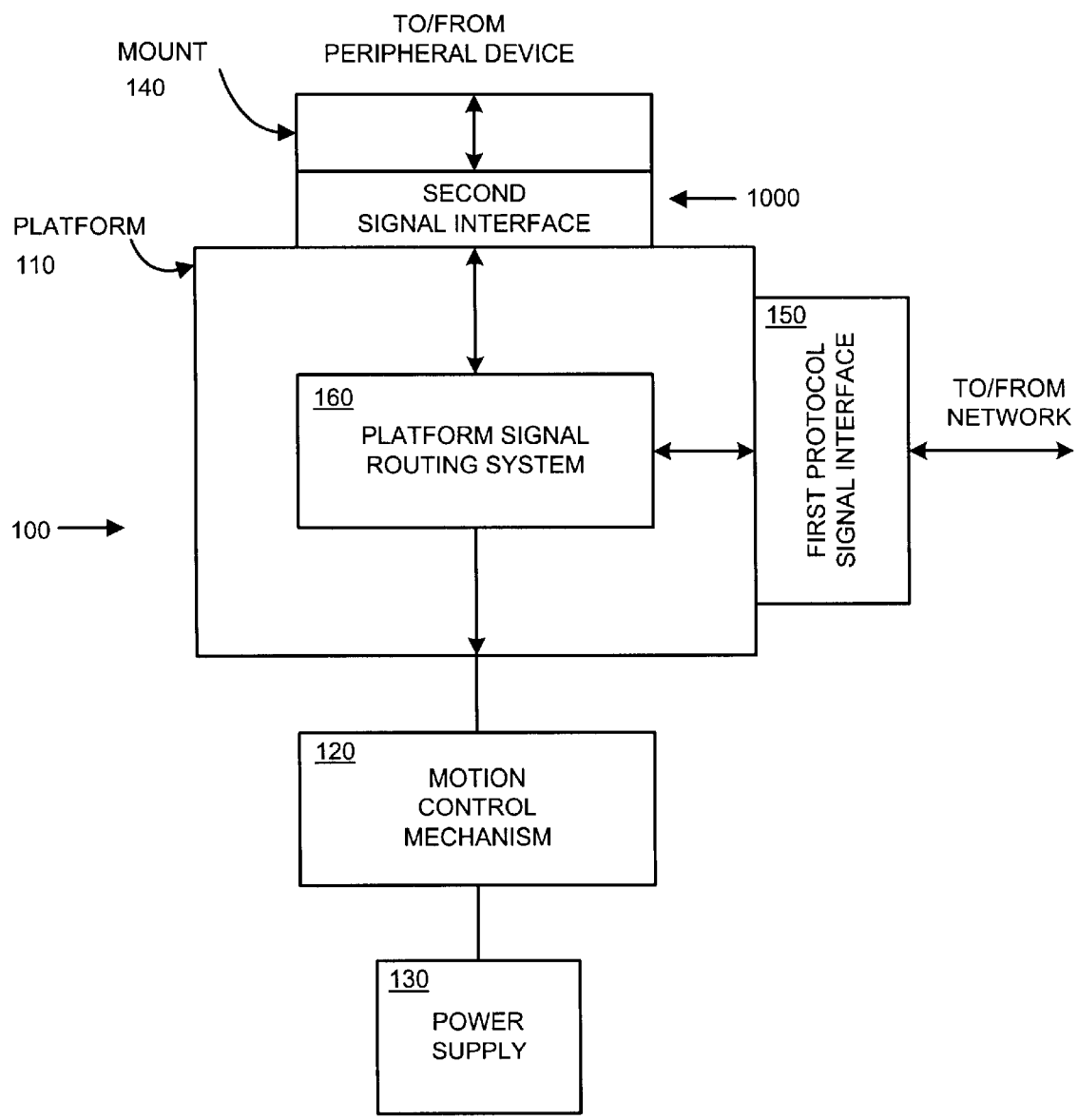
FIG. 10 is a block diagram of a docking station with motion control and first and second signal interfaces, in accordance with another embodiment of the present invention.

FIG. 10 is a block diagram of docking station 100, in accordance with another embodiment of the present invention. Docking station 100 comprises platform 110, motion control mechanism 120, power source 130, mount 140, first signal interface 150, second signal interface 1000, and platform signal routing system 160. The system is configured as above, except that mount 140, first signal interface 150, second signal interface 1000, and platform signal routing system 160 are located in or on platform 110. Also, second signal interface 1000 interfaces platform 110 with a peripheral device.

Figure 11:
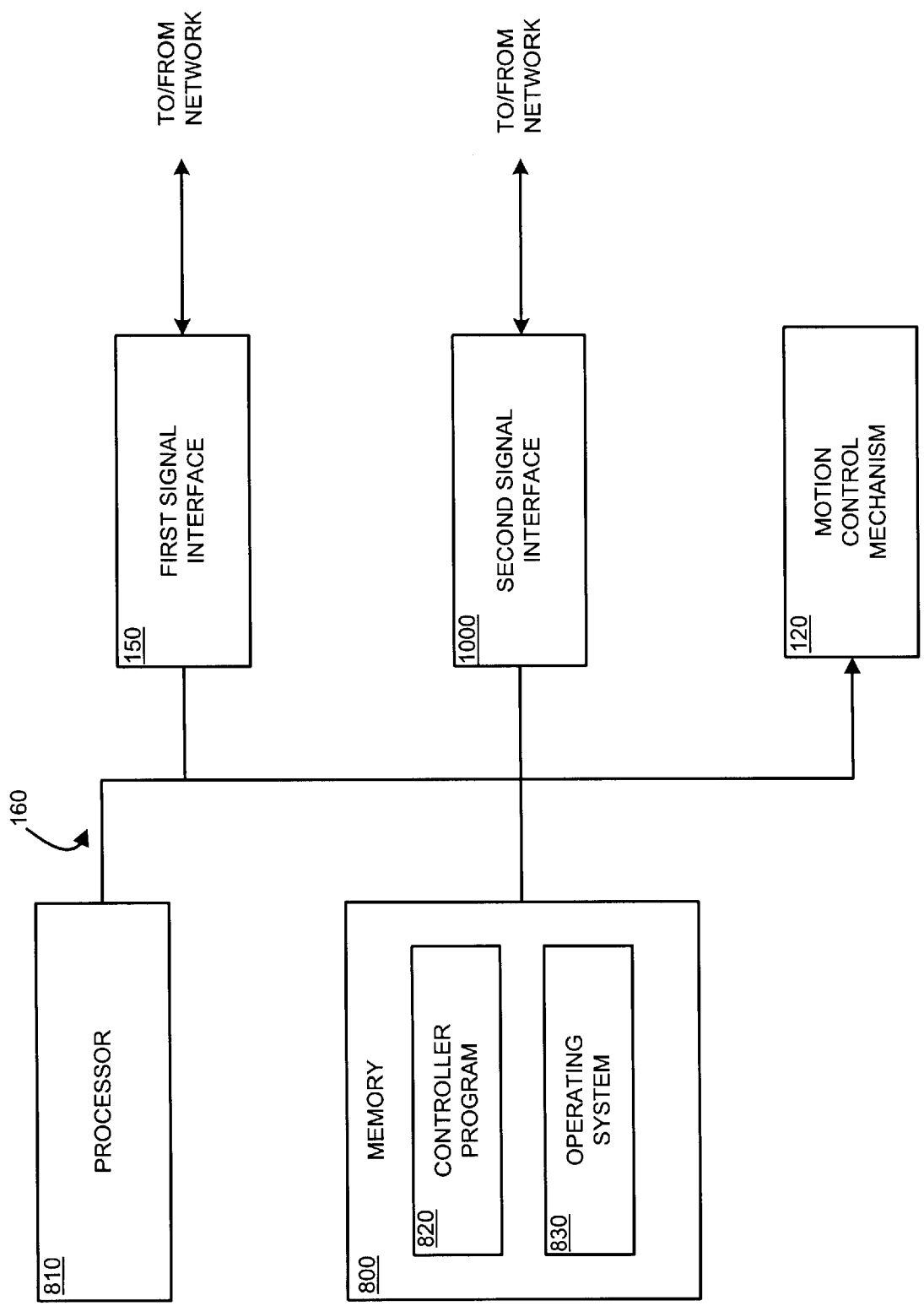
FIG. 11 is a block diagram of a platform signal routing system for a docking station with motion control and first and second signal interfaces, in accordance with another embodiment of the present invention.

FIG. 11 is a block diagram of platform signal routing system 160, in accordance with another embodiment of the present invention. Platform signal routing system 160 electrically connects and routes signals between motion control mechanism 120, first signal interface 150, second signal interface 1000, memory 800, and processor 810.

Figure 12:
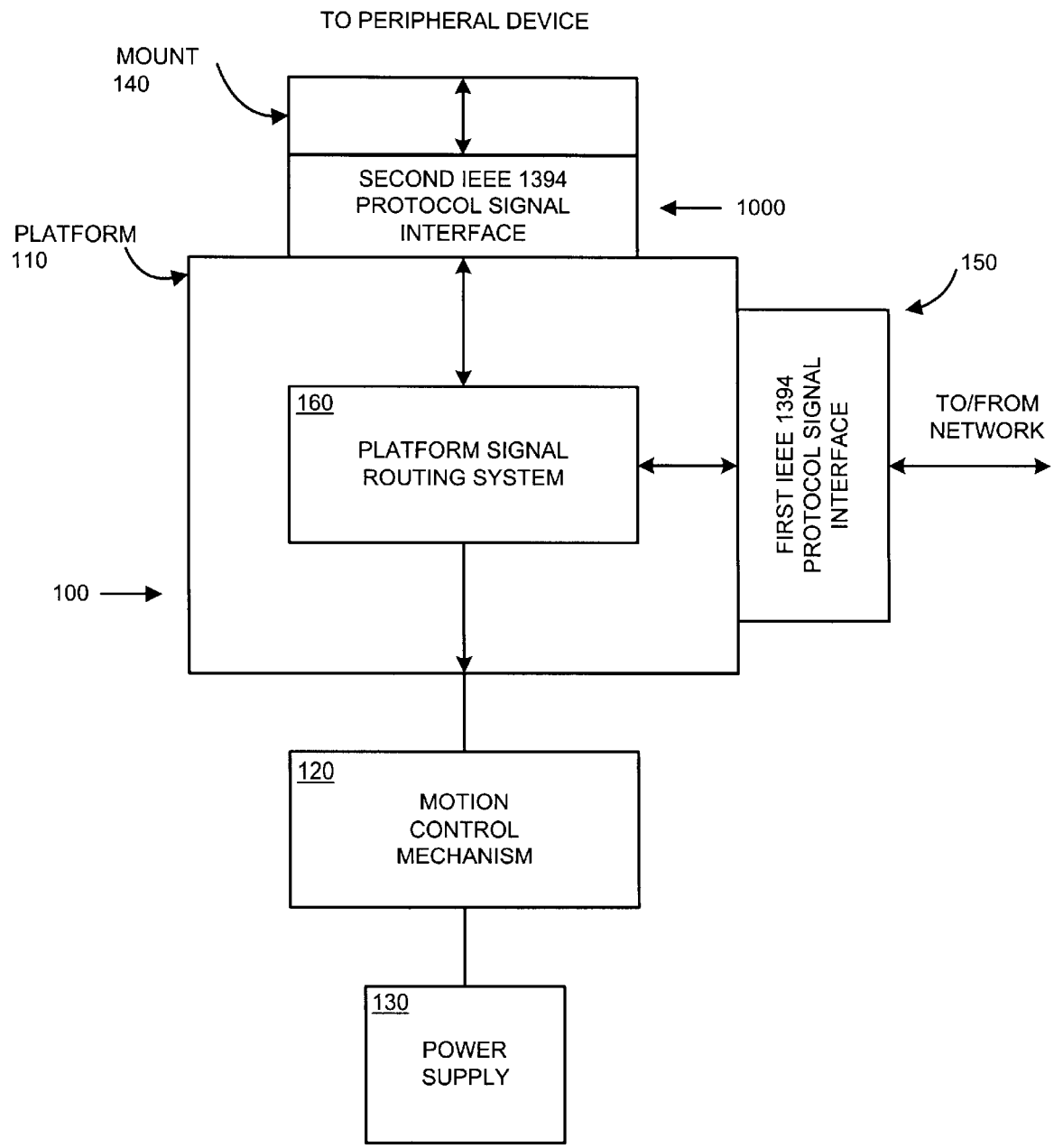
FIG. 12 is a block diagram of a docking station with motion control and first and second IEEE 1394 protocol signal interfaces, in accordance with another embodiment of the present invention.

FIG. 12 is a block diagram of docking station 100, in accordance with another embodiment of the present invention. Docking station 100 comprises platform 110, motion control mechanism 120, power source 130, mount 140, first signal interface 150, second signal interface 1000, and platform signal routing system 160. The system is configured as above, except that first signal interface 150 and second signal interface 1000 are high-speed serial interfaces or IEEE 1394 protocol signal interfaces, and platform signal routing system 160 is a high-speed or IEEE 1394 protocol platform routing system.

Mount 140 may be custom designed so that attaching a IEEE 1394 protocol peripheral device to platform 110 automatically connects the IEEE 1394 protocol peripheral device with second signal interface 1000.

Figure 13:
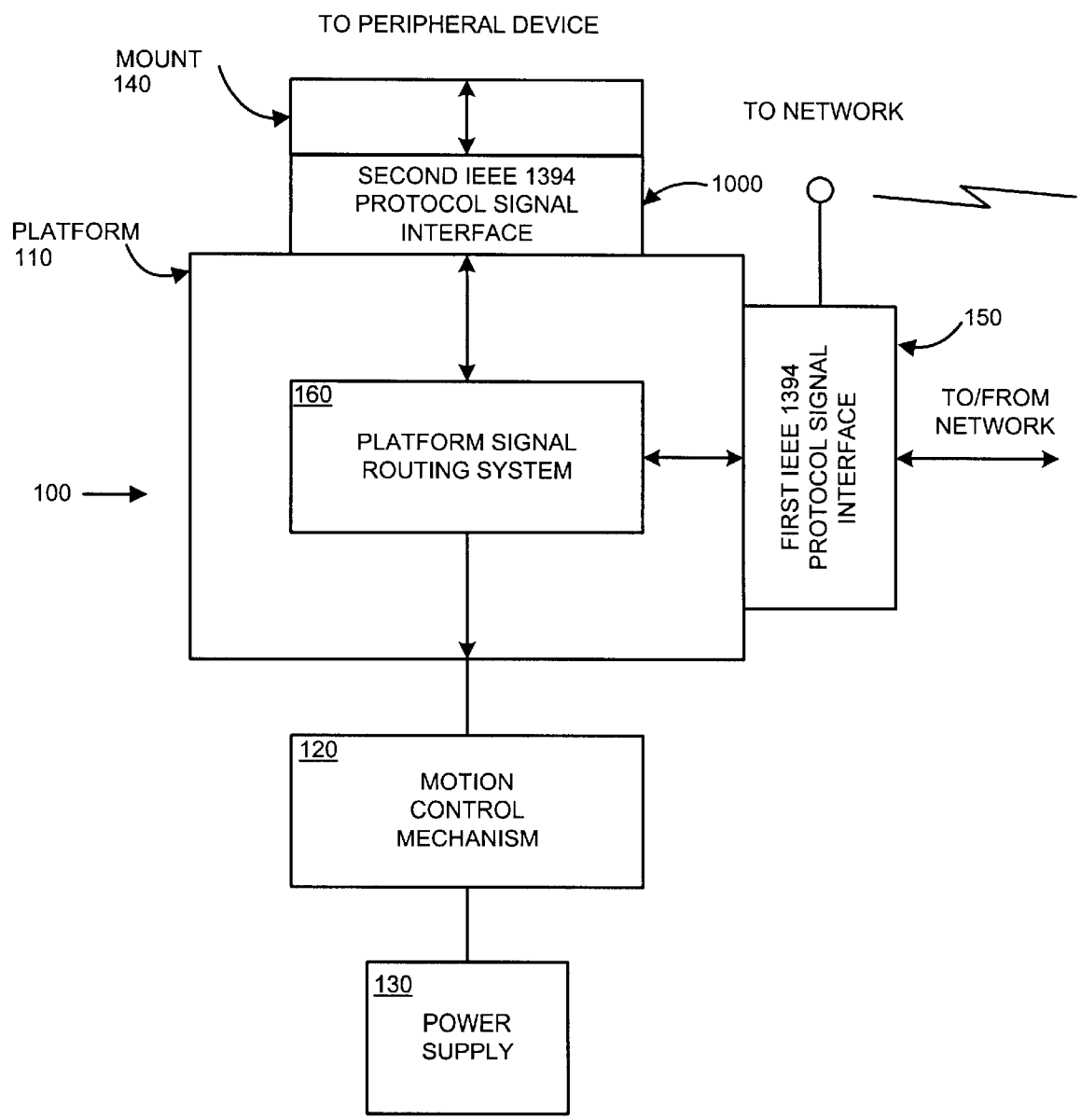
FIG. 13 is a block diagram of a docking station with motion control, a wireless first IEEE 1394 protocol signal interface, and a second IEEE 1394 protocol signal interface, in accordance with another embodiment of the present invention.

FIG. 13 is a block diagram of docking station 100, in accordance with another embodiment of the present invention. Docking station 100 comprises platform 110, motion control mechanism 120, power source 130, mount 140, first signal interface 150, second signal interface 1000, and platform signal routing system 160. The system is configured as above, except that first signal interface 150 is configured as a wireless connection.

Figure 14:
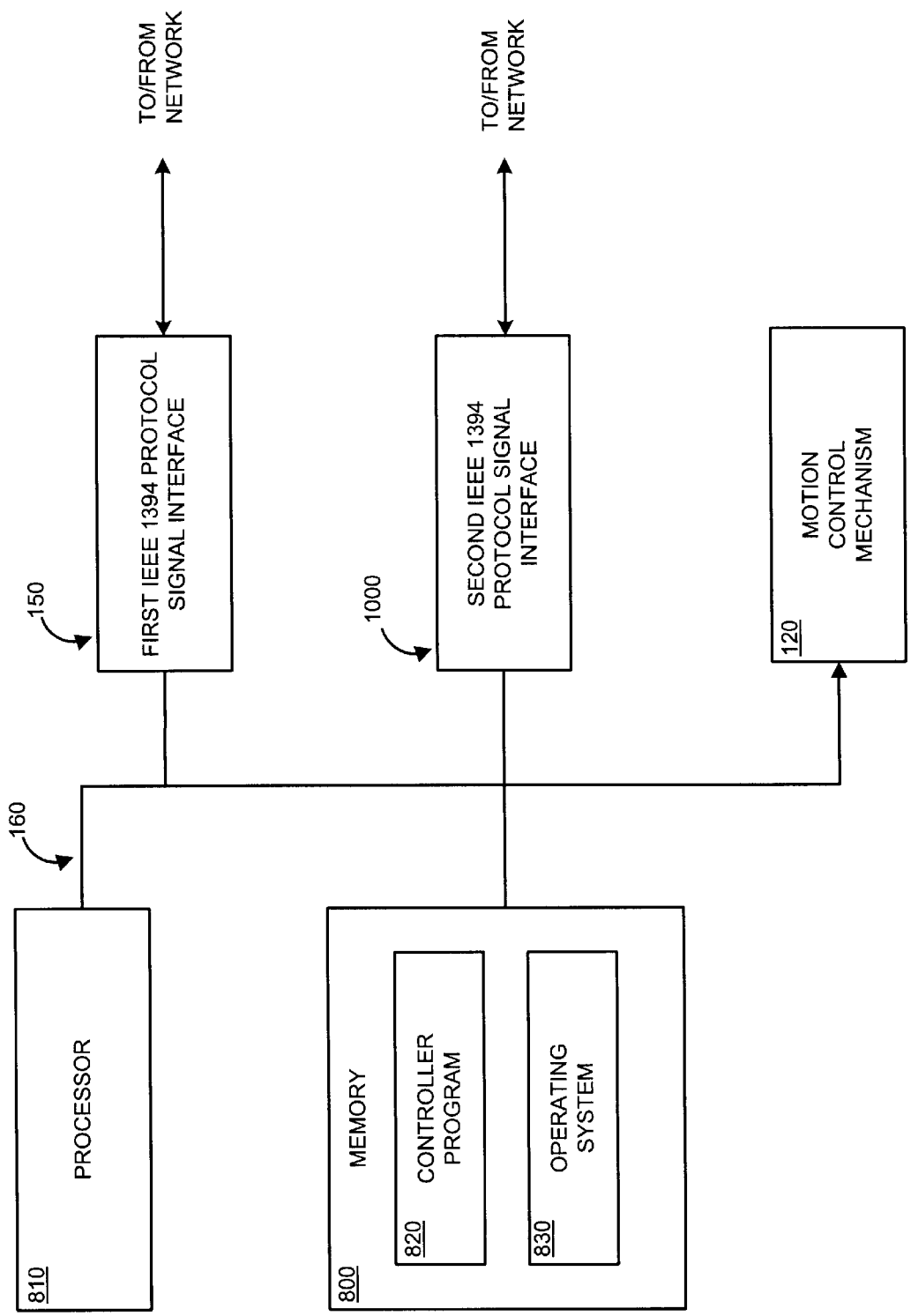
FIG. 14 is a block diagram of a platform signal routing system for a docking station with motion control and first and second IEEE 1394 protocol signal interfaces, in accordance with another embodiment of the present invention.

FIG. 14 is a block diagram of platform signal routing system 160, in accordance with another embodiment of the present invention. Platform signal routing system 160 connects motion control mechanism 120, first signal interface 150, second signal interface 1000, memory 800, and processor 810. The system is configured as above, except that platform signal routing system 160 routes signals at least from first signal interface 150 to motion control mechanism 120 and from second signal interface 1000 to first signal interface 150. In FIG. 14, first signal interface 150 and second signal interface 1000 are high-speed serial interfaces or IEEE 1394 protocol signal interfaces. Additionally, platform signal routing system 160 is a high-speed or IEEE 1394 protocol platform signal routing system.

Platform signal routing system 160 may be configured to route signals at least between first signal interface 150 and motion control mechanism 120 and between second signal interface 1000 and first signal interface 150.

It will be apparent to those skilled in the art that various modifications and variations can be made in the apparatus of the present invention without departing from the spirit or scope of the invention. Thus, it is intended that the present invention cover these modifications and variations of this invention provided that they come within the scope of the appended claims and their equivalents.

What is claimed is:

1. A docking station, comprising:
   a platform;
   a motion control mechanism operably coupled to said platform;
   a power source operably coupled to said motion control mechanism;
   a mount on said platform for attaching a peripheral device to said platform;
   a first signal interface interfacing said platform with a network; and
   a platform signal routing system configured at least in part to route signals between said first signal interface and said motion control mechanism.

2. The docking station of claim 1, wherein said platform exhibits multiple-degree freedom of motion.

3. The docking station of claim 1, wherein said first signal interface is configured as a wireless connection.

4. The docking station of claim 3, wherein said platform exhibits multiple-degree freedom of motion.

5. A docking station, comprising:
   a platform;
   a motion control mechanism operably coupled to said platform;
   a power source operably coupled to said motion control mechanism;
   a mount on said platform for attaching a peripheral device to said platform;
   a first signal interface interfacing said platform with a network;
   a second signal interface interfacing said platform with said peripheral device; and
   a platform signal routing system configured at least in part to route signals from said first signal interface to said motion control mechanism and from said second signal interface to said first signal interface.

6. The docking station of claim 5, wherein said platform exhibits multiple-degree freedom of motion.

7. The docking station of claim 5, wherein said first signal interface is configured as a wireless connection.

8. The docking station of claim 7, wherein said platform exhibits multiple-degree freedom of motion.

9. A docking station, comprising:
   a platform;
   a motion control mechanism operably coupled to said platform;
   a power source operably coupled to said motion control mechanism;
   a mount on said platform for attaching a peripheral device to said platform;
   a first high-speed serial interface interfacing said platform with a network; and
   a high-speed platform signal routing system configured at least in part to route signals between said first high-speed serial interface and said motion control mechanism.

10. The docking station of claim 9, wherein said platform exhibits multiple-degree freedom of motion.

11. The docking station of claim 9, wherein said first high-speed serial interface is configured as a wireless connection.

12. The docking station of claim 11, wherein said platform exhibits multiple-degree freedom of motion.

13. A docking station, comprising:
    a platform;
    a motion control mechanism operably coupled to said platform;
    a power source operably coupled to said motion control mechanism;
    a mount on said platform for attaching a peripheral device to said platform;
    a first high-speed serial interface interfacing said platform with a network;
    a second high-speed serial interface interfacing said platform with said peripheral device; and
    a high-speed platform signal routing system configured at least in part to route signals from said first high-speed serial interface to said motion control mechanism.

14. The docking station of claim 13, wherein said platform exhibits multiple-degree freedom of motion.

15. The docking station of claim 13, wherein said first high-speed serial interface is configured as a wireless connection.

16. The docking station of claim 15, wherein said platform exhibits multiple-degree freedom of motion.

17. A docking station, comprising:
    a platform;
    a motion control mechanism operably coupled to said platform;
    a power source operably coupled to said motion control mechanism;
    a mount on said platform for attaching a peripheral device to said platform;
    an IEEE 1394 protocol signal interface interfacing said platform with a network; and
    an IEEE 1394 protocol platform signal routing system configured at least in part to route signals between said IEEE 1394 protocol signal interface and said motion control mechanism.

18. The docking station of claim 17, wherein said platform exhibits multiple-degree freedom of motion.

19. The docking station of claim 17, wherein said IEEE 1394 protocol signal interface is configured as a wireless connection.

20. The docking station of claim 19, wherein said platform exhibits multiple-degree freedom of motion.

21. A docking station, comprising:
    a platform;
    a motion control mechanism operably coupled to said platform;
    a power source operably coupled to said motion control mechanism;
    a mount on said platform for attaching an IEEE 1394 protocol peripheral device to said platform;

a first IEEE 1394 protocol signal interface interfacing said platform with a network;

a second IEEE 1394 protocol signal interface interfacing said platform with said IEEE 1394 protocol peripheral device; and an IEEE 1394 protocol platform signal routing system configured at least in part to route signals from said first IEEE 1394 protocol signal interface to said motion control mechanism and from said second IEEE protocol signal interface to said first IEEE 1394 protocol signal interface.

22. The docking station of claim 21, wherein said platform exhibits multiple-degree freedom of motion.

23. The docking station of claim 21, wherein said first IEEE 1394 protocol signal interface is configured as a wireless connection.

24. The docking station of claim 23, wherein said platform exhibits multiple-degree freedom of motion.

25. The docking station of claim 21, wherein attaching said IEEE 1394 protocol peripheral device to said platform automatically connects said IEEE 1394 protocol peripheral device with said second IEEE 1394 protocol signal interface.

26. The docking station of claim 25, wherein said platform exhibits multiple-degree freedom of motion.

27. The docking station of claim 25, wherein said first IEEE 1394 protocol signal interface is configured as a wireless connection.

28. The docking station of claim 27, wherein said platform exhibits multiple-degree freedom of motion.

29. A docking station, comprising:

a platform;

a motion control mechanism operably coupled to said platform;

a power source operably coupled to said motion control mechanism;

a mount on said platform for attaching an IEEE 1394 protocol peripheral device to said platform;

a first IEEE 1394 protocol signal interface interfacing said platform with a network;

a second IEEE 1394 protocol signal interface interfacing said platform with said IEEE 1394 protocol peripheral device; and an IEEE 1394 protocol platform signal routing system configured at least in part to route signals between said first IEEE 1394 protocol signal interface and said motion control mechanism and between said second IEEE 1394 protocol signal interface and said first IEEE protocol signal interface.

30. The docking station of claim 29, wherein said platform exhibits multiple-degree freedom of motion.

31. The docking station of claim 29, wherein said first IEEE 1394 protocol signal interface is configured as a wireless connection.

32. The docking station of claim 31, wherein said platform exhibits multiple-degree freedom of motion.

33. The docking station of claim 29, wherein attaching said IEEE 1394 protocol peripheral device to said platform automatically connects said IEEE 1394 protocol peripheral device with said second IEEE 1394 protocol signal interface.

34. The docking station of claim 33, wherein said platform exhibits multiple-degree freedom of motion.

35. The docking station of claim 33, wherein said first IEEE 1394 protocol signal interface is configured as a wireless connection.

36. The docking station of claim 35, wherein said platform exhibits multiple-degree freedom of motion.

37. A docking station, comprising:

a platform;

means for controlling the motion of said platform;

means for attaching a peripheral device to said platform;

means for interfacing said platform with a network; and means for routing signals between said interfacing means and said motion control means.

38. A docking station, comprising:

a platform;

means for controlling the motion of said platform;

means for attaching a peripheral device to said platform;

means for interfacing said platform with a high-speed network; and means for routing high-speed signals between said interfacing means and said motion control means.

39. A docking station, comprising:

a platform;

means for controlling the motion of said platform;

means for attaching a peripheral device to said platform;

means for interfacing said platform with an IEEE 1394 protocol network; and means for routing IEEE 1394 protocol signals between said interfacing means and said motion control means.

40. A docking station, comprising:

a platform;

means for controlling the motion of said platform;

means for attaching an IEEE 1394 protocol peripheral device to said platform;

first means for interfacing said platform with an IEEE 1394 protocol network;

second means for interfacing said platform with said IEEE 1394 protocol peripheral device;

first means for routing IEEE 1394 protocol signals from said first interfacing means to said motion control means; and second means for routing IEEE 1394 protocol signals from said second interfacing means to said first interfacing means.

41. A docking station, comprising:

a platform;

means for controlling the motion of said platform;

means for attaching an IEEE 1394 protocol peripheral device to said platform;

first means for interfacing said platform with an IEEE 1394 protocol network;

second means for interfacing said platform with said IEEE 1394 protocol peripheral device;

first means for routing IEEE 1394 protocol signals between said first interfacing means and said motion control means; and second means for routing IEEE 1394 protocol signals between said second interfacing means and said first interfacing means.

* * * * *